(12) United States Patent
Moon

(10) Patent No.: US 6,726,242 B2
(45) Date of Patent: Apr. 27, 2004

(54) INTEGRAL AIRBAG EXHAUST VENT

(75) Inventor: Steven G. Moon, Swartz Creek, MI (US)

(73) Assignee: TK Holdings, Inc., Auburn Hills, MI (US)

( * ) Notice: Subject to any disclaimer, the term of this patent is extended or adjusted under 35 U.S.C. 154(b) by 0 days.

(21) Appl. No.: 10/134,115

(22) Filed: Apr. 27, 2002

(65) Prior Publication Data

US 2003/0201630 A1 Oct. 30, 2003

(51) Int. Cl.⁷ ............................................... B60R 21/16
(52) U.S. Cl. ..................... 280/739; 280/743.1
(58) Field of Search .................. 280/728.1, 730.2, 280/731, 736, 738, 739, 743.1

(56) References Cited

U.S. PATENT DOCUMENTS

| 3,560,018 | A | 2/1971 | Goetz .................. 280/150 |
| 4,097,065 | A | 6/1978 | Okada et al. .......... 280/739 |
| 4,169,613 | A | 10/1979 | Barnett ................ 280/732 |
| 4,181,325 | A | 1/1980 | Barnett ................ 280/739 |
| 4,805,930 | A | 2/1989 | Takada ................ 280/739 |
| 5,007,662 | A | 4/1991 | Abramczyk et al. ..... 280/739 |
| 5,186,488 | A | 2/1993 | Takano ................ 280/728 |
| 5,219,179 | A | 6/1993 | Eyrainer et al. ...... 280/739 |
| 5,393,092 | A | 2/1995 | Charns et al. ........ 280/743 |
| 5,460,408 | A | 10/1995 | Conley, Jr. .......... 280/743.1 |
| 5,492,363 | A | 2/1996 | Hartmeyer et al. ..... 280/739 |
| 5,533,753 | A | 7/1996 | Abraham .............. 280/739 |
| 5,568,937 | A | 10/1996 | Conley, Jr. .......... 280/743.1 |
| 5,613,348 | A | 3/1997 | Lunt et al. .......... 53/429 |
| 5,630,620 | A | 5/1997 | Hirai et al. ......... 280/743.1 |
| 5,642,900 | A | 7/1997 | Patel ................ 280/728.2 |
| 5,704,639 | A | 1/1998 | Cundill et al. ....... 280/739 |
| 5,803,121 | A | 9/1998 | Estes ................ 137/849 |
| 5,855,393 | A | 1/1999 | Keshavaraj ........... 280/743.1 |

FOREIGN PATENT DOCUMENTS

EP   0 867 266 B1   9/1998   .......... B29C/45/14

Primary Examiner—Paul N. Dickson
Assistant Examiner—Toan To
(74) Attorney, Agent, or Firm—Dinnin & Dunn, P.C.

(57) ABSTRACT

A vent for an airbag is formed by at least two intersecting cuts disposed in the airbag material. Each cut terminates at opposite ends with a rounded end portion for stress release. The cuts are preferably placed in the cushion so as to be at 45 degree angles from the warp and weave threads of a woven cushion material.

7 Claims, 3 Drawing Sheets

INTEGRAL AIRBAG EXHAUST VENT

FIELD OF THE INVENTION

This invention relates generally to a venting system for vehicle airbags, and more particularly to the configuration of the vent of an airbag.

BACKGROUND AND SUMMARY OF THE INVENTION

Inflatable airbags are inflated by gas directed into the airbag in response to a vehicle experiencing a sudden deceleration above a predetermined threshold. The inflated airbag absorbs energy resulting from the movement of an occupant within the vehicle compartment against the airbag. The energy absorbed by the airbag is dissipated to minimize rebounding the occupant from the airbag.

One way to dissipate the energy absorbed by the airbag is to vent the inflation fluid from the airbag. This venting occurs either through the porous bag material or through discrete vents or openings in the cushion. Typically, the vent opening has a circular shape. The vent opening is formed by cutting circular pieces of material from the airbag. Often, the discrete vent openings are reinforced with a panel sewn to the material of the airbag around the vent opening. It is thought that this reinforcement structure reduces stretching of the vent opening allowing for better control of the discharge of inflation fluids from the bag. Often, the edges of the material of the airbag surrounding a vent may fray. There is a concern in the industry that this frayed material may lead to a tear initiation site or may interact with the hot inflation gases to produce undesirable byproducts.

In accordance with one aspect of the present invention, an inflatable airbag is provided for, when inflated, restraining the vehicle occupant during a collision. The airbag includes a fabric material having an outer surface and an inner surface. The inner surface defines a chamber in which inflation fluid is directed to inflate the airbag. The fabric material includes at least one pair of generally perpendicular slots defining a vent therein. The generally perpendicular slots define four triangular flap portions which when opened define a square vent opening. When hot exhaust gases leave the cushion the generally triangular flap portions fold out of the way reducing the exposure of the thread ends to the discharged gases. It is particularly relevant to note that in contrast to known designs, these flap portions need not be sewed onto the cushion material but interact with the discharging gases upon deployment.

In accordance with another aspect of the present invention, a method of forming an airbag from airbag material comprising the steps of creating a pair of generally perpendicular cuts at a location in the airbag material, and sewing the airbag components together to define an inner chamber for accepting the inflation gases. Preferably, the pair of generally perpendicular cuts define at least four triangular flaps in the airbag material such that upon inflation of said airbag, said triangular flaps open up to define a square vent opening.

DESCRIPTION OF THE DRAWINGS

The foregoing and other features of the present invention will become apparent to one skilled in the art to which the present invention relates upon consideration of the following description of the invention with reference to the accompanying drawings wherein.

DESCRIPTION OF THE PREFERRED EMBODIMENT

The present invention is directed to an inflatable airbag for restraining vehicle occupants when the vehicle experiences a collision. As one of ordinary skill will appreciate, the airbag may be housed within a steering wheel, within the head curtain in a side airbag system, or within a knee-blocker system for example. The specific construction of the airbag is not part of the present invention and may vary. For example, the airbag may be constructed of a woven material or the airbag may be constructed of a polymeric film made from a polyurethane resin for example. The European Patent Specification, EP 0 867 266 B1, herein incorporated by reference in its entirety, exemplifies a state of the art resin bag.

Figure 1:
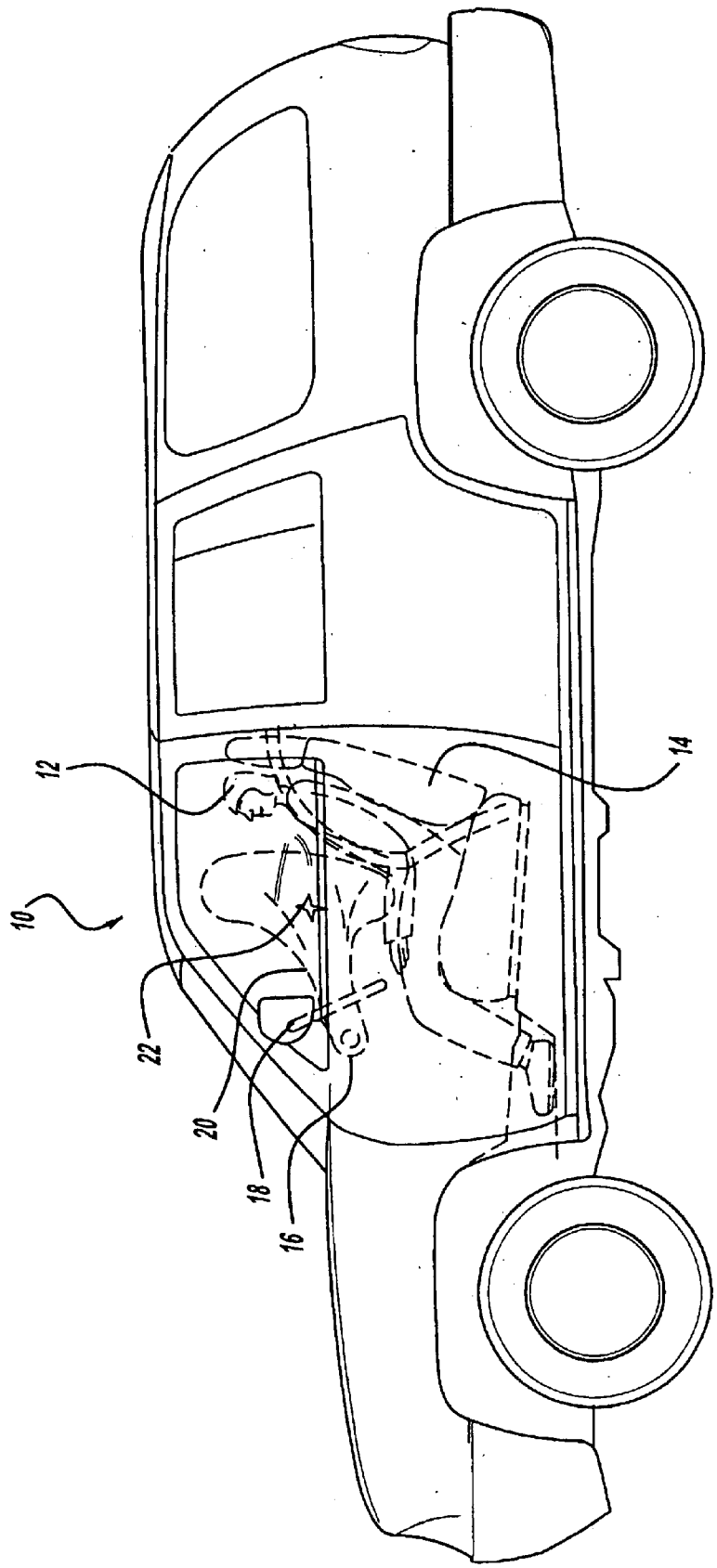
FIG. 1 is a schematic drawing of a vehicle occupant restraining system including an inflatable airbag having a vent opening, constructed in accordance with the principles of the present invention.

Referring to FIG. 1, an occupant safety restraint 10 is incorporated into a vehicle for restraining the occupant 12 seated in seat 14. The system 10 has an airbag module 16 disposed within a vehicle's instrument panel 18. The airbag module 16 is shown having its airbag 20 in its fully deployed state as represented in phantom. Also shown, is the vent 22 that is the subject of the current invention.

Figure 2:
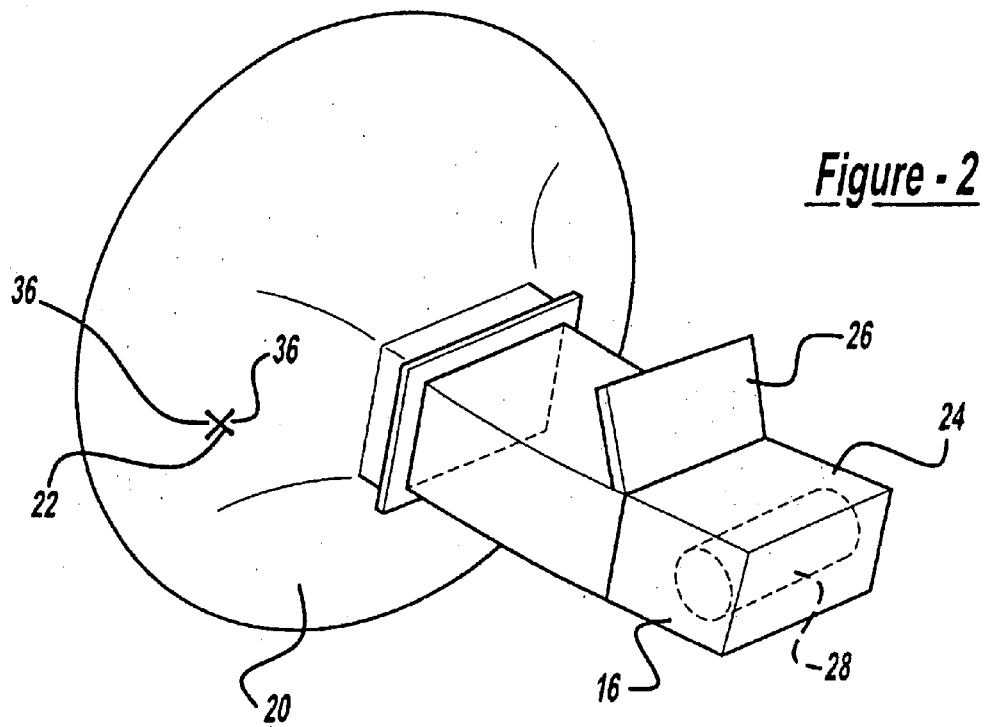
FIG. 2 is a perspective view of the airbag module shown in FIG. 1 with the airbag in its inflated condition.

FIG. 2 depicts an airbag module 16 having a housing 24 for enclosing a folded cushion 20. Further disposed within the module 16 is an inflator 28 for producing inflation gas upon the detection of a collision. Covering the folded cushion 20 is a airbag cover or door 26. The door shown is integral to the module but as is known, can be incorporated into the steering wheel or instrument panel 18 of the vehicle. Cushion 20 is shown having a vent 22. Further depicted is a plurality of generally triangular flaps 36 that fold outward when the airbag is deployed and the exhaust gases exit the airbag upon deflation during a crash event.

Figure 3:
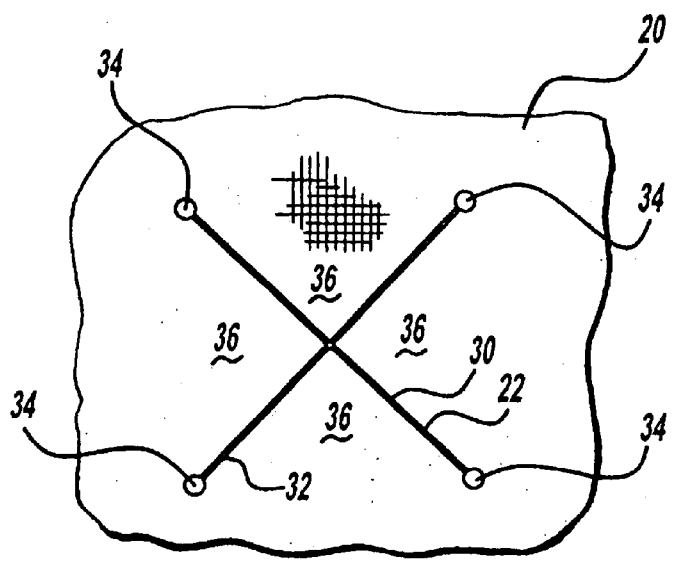
FIG. 3 is a detailed view showing the vent opening in the airbag.

As is best seen in FIG. 3, the vent opening 22 is formed by two intersecting slits or cuts 30, 32 which are made into the material of the airbag 20 to form an "X" having four ends or corners 34. It is preferred that each of the intersecting cuts extends transverse to the warped threads and the weave threads of the woven material of the airbag 20. A laser or mechanical die for example, may be used to make the intersecting cuts in the material of the airbag 20. Accordingly, when the airbag 20 is a woven material, it is preferred that the intersecting slits or cuts 30, 32 extend approximately 40 to 50 degrees relative to said warp threads and approximately 40 to 50 degrees relative to said weave threads. It is more preferred that when the airbag is a woven material, the intersecting slits or cuts 30, 32 extend approximately 45 degrees relative to said warp threads and approximately 45 degrees relative to said weave threads. The four corners 34 of the "X" pattern are rounded to reduce stress concentrations in the area of the corners during deployment. In woven airbags, slits oriented as described above inhibit the tendency of the airbag surrounding the vent 22 to fray, thereby inhibiting the formation of tear initiation sites.

Figure 4A:
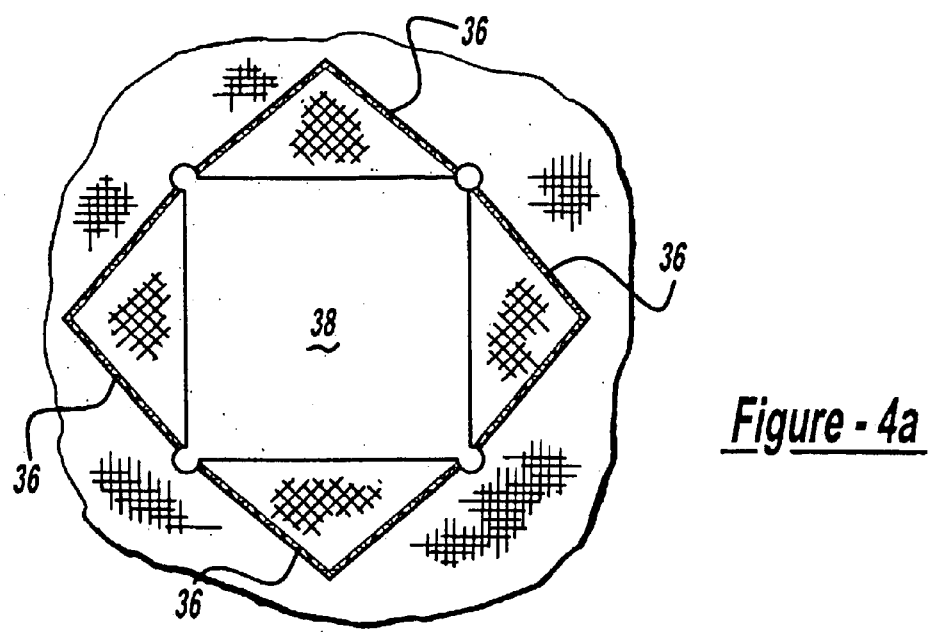
FIG. 4a is a plain view of the vent opening with the flaps shown folded back during inflation of the airbag.

Each of the four triangular flap portions 36 is allowed to freely move and are not in a separate manufacturing step secured to the airbag material. Rather, the slits 30, 32 define the four triangular flap portions 36 thereby forming flaps 36 integral to the actual airbag material 20. During a deployment of the airbag module, exhaust gases pass through the vent opening 22 to form a square vent 38 as shown in FIG. 4*a*.

Figure 4B:
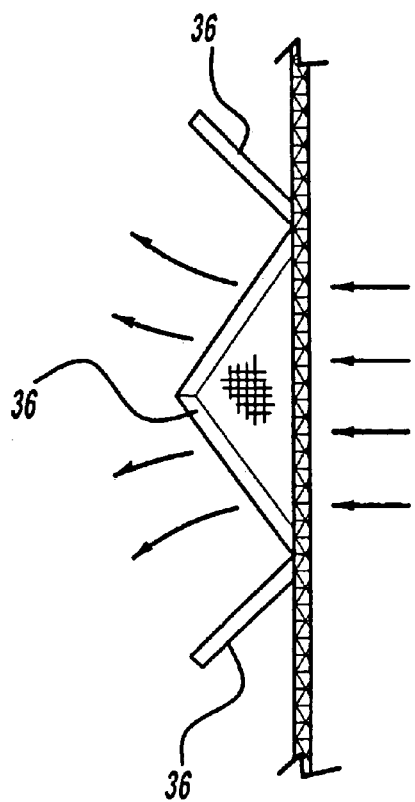
FIG. 4b is a side view of the vent opening with the flaps shown folded back during inflation of the airbag.

As is best seen in FIG. 4*b*, when the airbag is deployed and gases are vented through the vent opening 38 the triangular flaps 36 extend away from the cushion material. Although the vent size is defined by the square caused by the X-shaped slits, the edges of the slits 30 and 32 are not exposed to the gases, since the flaps are folded generally away from the vent as the gases are vented through the vent opening 38. This allows for a defined vent size that does not have the detrimental effects of having a large cut surface immediately adjacent to the vent opening.

When a vehicle collision requiring an airbag deployment occurs, inflation fluid is directed into the cushion or airbag 20 by inflator 28, as is show in FIG. 1. The occupant 12 moves forward against the airbag 20. As the airbag 20 absorbs the energy from the moving occupant 12 against the airbag 20, the pressure of the interior of the airbag 20 increases. As the pressure in the interior of the airbag increases, inflation fluid in the interior of the airbag flows through the square vent opening 22 to relieve pressure within the interior of the airbag 20. As can be seen in FIG. 4*a*, the edges around the vent opening 22 do not contain thread ends. This reduces the amount of fraying of the cut fabric edges, and therefore reduces the risk of tearing of the cushion or of indirection between the hot discharge gases and the fabric. The ability to form a vent opening according to the principles of the present invention provides significant cost savings to the manufacturer since the vent opening can be formed by a simple cutting process and does not require any reinforcement or other sewing steps.

From the above description of the invention, those skilled in the art to which the present invention relates will perceive improvements, changes and modifications. Such improvements, changes and modifications within the skill in the art to which the present invention relates are intended to be covered by the appended claims.

We claim:

1. An inflatable airbag comprising:

airbag material defining a closed chamber having a first opening though which inflator fluid is directed;

said airbag material defining a vent opening formed by at least two intersecting cuts for venting inflation fluid from said chamber, and, said vent opening defining vent edges and said vent opening having an unsewn or unreinforced periphery about said edges; and said vent opening having a plurality of flaps defined by at least two intersecting cuts, said plurality of flaps extending toward one another in an uninflated condition and are bent outward away from said vent opening when said airbag is inflated.

2. The airbag of claim 1 wherein said cuts define a first and second end which each terminate at a rounded end portion.

3. The airbag of claim 1 wherein said airbag material is a woven material having warp threads and weave threads which extend perpendicular to said warp threads, said intersecting cuts extending at approximately 40 to 50 degrees relative to said warp threads and approximately 40 to 50 degrees relative to said weave threads.

4. The airbag of claim 2 wherein said airbag material is a woven material having warp threads and weave threads which extend perpendicular to said warp threads, said intersecting cuts extending approximately 40 to 50 degrees relative to said warp threads and approximately 40 to 50 degrees relative to said weave threads.

5. The airbag of claim 1 wherein said airbag material is a woven material having warp threads and weave threads which extend perpendicular to said warp threads, said intersecting cuts extending approximately 45 degrees relative to said warp threads and approximately 45 degrees relative to said weave threads.

6. The airbag of claim 2 wherein said airbag material is a woven material having warp threads and weave threads which extend perpendicular to said warp threads, said intersecting cuts extending approximately 45 degrees relative to said warp threads and approximately 45 degrees relative to said weave threads.

7. The airbag of claim 1 wherein said airbag material is a polymeric material forming a film cushion.

\* \* \* \* \*